United States Patent
Robert

(10) Patent No.: US 7,225,098 B2
(45) Date of Patent: May 29, 2007

(54) MONITORING DEVICE WITH OPTIMIZED BUFFER

(75) Inventor: Xavier Robert, Saint Georges de Commiers (FR)

(73) Assignee: STMicroelectronics S.A., Montrouge (FR)

(*) Notice: Subject to any disclaimer, the term of this patent is extended or adjusted under 35 U.S.C. 154(b) by 79 days.

(21) Appl. No.: 10/535,064

(22) PCT Filed: Nov. 21, 2002

(86) PCT No.: PCT/FR02/03996

§ 371 (c)(1), (2), (4) Date: May 13, 2005

(87) PCT Pub. No.: WO2004/049163

PCT Pub. Date: Jun. 10, 2004

(65) Prior Publication Data

US 2006/0195682 A1 Aug. 31, 2006

(51) Int. Cl.
*G06F 9/44* (2006.01)

(52) U.S. Cl. ............... 702/117; 714/718; 710/22; 711/100; 711/200; 712/227

(58) Field of Classification Search ............ 702/117, 702/119, 120, 123; 712/227; 714/38–39, 714/46, 746, 718, 723, 42; 710/22; 711/200, 711/100

See application file for complete search history.

(56) References Cited

U.S. PATENT DOCUMENTS 5,724,505 A 3/1998 Argade et al.
5,848,264 A * 12/1998 Baird et al. ............... 703/28
5,974,573 A 10/1999 Martin
6,025,853 A * 2/2000 Baldwin ................. 345/506
6,052,774 A 4/2000 Segars et al.
2002/0013893 A1 1/2002 Roy et al.
2006/0155970 A1 * 7/2006 Regnier .................. 712/227

FOREIGN PATENT DOCUMENTS

EP 1184790 A 3/2002

OTHER PUBLICATIONS

International Search Report from corresponding International Application No. PCT/FR2002/003996, filed Nov. 21, 2002.
International Search report from a related International Application No. PCT/FR2002/003908, filed Nov. 14, 2002.
International Search report from a related International Application No. PCT/FR2002/003909, filed Nov. 14, 2002.
Nexis 5001 Forum: *Standard for a Global Embedded Processor Debug Interface*, Dec. 15, 1999, IEEE-ISTO XP002247195.

* cited by examiner

*Primary Examiner*—Michael Nghiem
*Assistant Examiner*—Hien Vo
(74) *Attorney, Agent, or Firm*—Lisa K. Jorgenson; James H. Morris; Wolf, Greenfield & Sacks, P.C.

(57) ABSTRACT

The invention concerns a monitoring device (18) integrated to a microprocessor chip (12) executing a series of instructions comprising: device (26) for producing simultaneously several types of monitoring messages of the microprocessor, a buffer (28) divided into several blocks (A, B, C, D, E) each of which is designed to store only messages of one of the types capable of being produced simultaneously, the size of each block depending on the maximum frequency at which the messages can be stored, and device (26) for, each time one or more messages are simultaneously stored in the blocks (A, B, C, D, E) of the buffer (28), storing in a predetermined block (F) of the buffer a coded value representing said block(s) of the buffer.

9 Claims, 2 Drawing Sheets

| A | B | C | D | E | F<br>A B C D E |
|---|---|---|---|---|---|
| JMP1 | WR1 | | | | 1 1 0 0 0 |

Fig 3A

| A | B | C | D | E | F<br>A B C D E |
|---|---|---|---|---|---|
| JMP1 | WR1 | RD2 | | | 1 1 0 0 0 |
| | | | | | 0 0 1 0 0 |

Fig 3B

| A | B | C | D | E | F<br>A B C D E |
|---|---|---|---|---|---|
| JMP1 | WR1 | RD2 | SYNC 3 | | 1 1 0 0 0 |
| JMP2 | WR3 | RD3 | | | 0 0 1 0 0 |
| | | | | | 1 1 1 1 0 |

Fig 3C

MONITORING DEVICE WITH OPTIMIZED BUFFER

BACKGROUND OF THE INVENTION

1. Field of the Invention

The present invention relates to the testing of microprocessors. It more specifically relates to a device and a method for, in a monitoring circuit integrated in a microprocessor chip, storing digital messages enabling following the operation of the microprocessor before transmitting the messages to an external analysis tool.

2. Discussion of the Related Art

Figure 1:
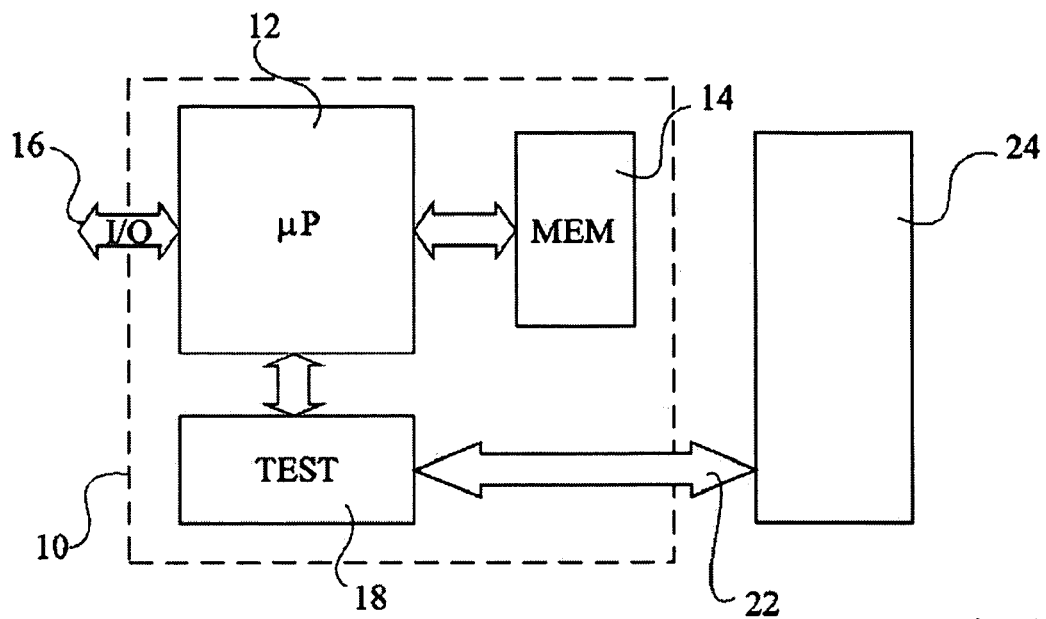

FIG. 1 schematically shows an integrated circuit 10 comprising a microprocessor (μP) 12, an internal memory (MEM) 14, and input/output terminals (I/O)16. Microprocessor 12 is intended to execute a program or software stored in memory 14. Under control of the program, microprocessor 12 may process data provided by input/output terminals 16 or stored in memory 14 and reading or writing data through input/output terminals 16.

To check the proper operation of the microprocessor, a monitoring circuit 18 is generally integrated on integrated circuit 10. Monitoring circuit 18 is capable of reading specific data provided by microprocessor 12 on execution of a program, and of possibly performing a processing on the read data. Test terminals 22 connect monitoring circuit 18 to an analysis tool 24. Analysis tool 24 may perform a processing of the received signals, for example, according to commands provided by a user, and ensure a detailed analysis of the operation of microprocessor 12. In particular, analysis tool 24 may determine the program instruction sequence really executed by microprocessor 12.

The number of test terminals 22 for a conventional monitoring circuit 18 may be on the same order of magnitude as the number of input/output terminals 16 of microprocessor 12, for example, from 200 to 400. Test terminals 22 as well as the connections of monitoring circuit 18 take up a significant silicon surface area, which causes an unwanted increase in the circuit cost. For this purpose, a first version of integrated circuit 10 comprising monitoring circuit 18 and test terminals 22 is generated in small quantities to adjust the program of microprocessor 12 or "user program". After this adjustment, a version of integrated circuit 10 without monitoring circuit 18 and without test terminals 22 is for sale. This requires providing two versions of the integrated circuit, which requires a significant amount of work and is relatively expensive. Further, the final chip is not necessarily identical to the tested chip.

To overcome the above-mentioned disadvantages, it is desired to form a monitoring circuit 18 which takes up a reduced surface area and only requires a reduced number of test terminals 22, which decreases the cost of monitoring circuit 18. Monitoring circuit 18 can then be left on the finally sold integrated circuit 10.

It is thus desired to decrease the number of signals provided by monitoring circuit 18. For this purpose, certain logic operations are directly performed at the level of monitoring circuit 18 on the data measured at the level of microprocessor 12 to only transmit messages having an important information content.

Thus, standard IEEE-ISTO-5001, in preparation1 provides in its 1999 version, accessible, for example, on website www.ieee-isto.org/Nexus5001, a specific message exchange protocol between a monitoring circuit and an analysis tool for a monitoring circuit 18 requiring but a reduced number of test terminals 22.

The monitoring circuit is provided to monitor the microprocessor operation and to provide the test terminals with predetermined messages corresponding to the execution of certain instructions only. Other messages correspond to the execution of certain instructions in certain predetermined conditions. The different types of messages and their structure are described in section 6 of standard IEEE-ISTO-5001.

Several messages may be provided within a reduced time interval. According to the standard; each new message is stored in a box, or storage area of predetermined size, of a buffer memory of first-in/first-out type (FIFO) when the test terminals are not available (when they are used to transmit another previously-generated message), after which the message is sent to the analysis tool, and the memory box is freed, when the test terminals are available. The buffer memory comprises a number n of boxes which depends on the frequency at which the messages can be written into the buffer memory and of course also of the frequency at which the buffer memory is read, and on the number of used test terminals.

Certain microprocessors can execute in parallel several instructions of the program. For example, a jump instruction can be executed simultaneously with a instruction for reading from and/or writing into memory 14. In such a case, two or three messages are generated at the same time. To store several messages generated at the same time, a solution consists of storing these messages at the same time in a same box of the buffer memory. This compels increasing the storage capacity of each box and thus of increasing the size of the buffer memory. This problem is all the greater as the microprocessor is capable of executing a large number of instructions at the same time. Further, according to the standard, an execution of the same instruction can generate messages of different types.

SUMMARY OF THE INVENTION

An object of the present invention is to provide a monitoring circuit according to standard JEEE-ISTO-5001 which enables monitoring a microprocessor, capable of generating a large number of messages at the same time, and having a buffer memory of reduced size.

Another object of the present invention is to provide an optimized method for storing in the buffer memory messages according to standard IEEE-ISTO-5001.

For this purpose, the present invention provides, when several types of messages are likely to be generated at the same time, dividing the buffer memory into several blocks, each of which is provided to only receive messages from one of the message types likely to be generated at the same time, the size of each block depending on the frequency at which the messages can be stored therein.

More specifically, the present invention provides a monitoring device integrated on the chip of a microprocessor executing a sequence of instructions, comprising: a message calculation means for generating digital messages of different types each corresponding to the execution of an instruction from among a plurality of predetermined instructions, the calculation means being capable of generating several types of messages at the same time; a buffer memory divided into several blocks, each of which is provided to only store messages of one of the types of messages likely to be generated at the same time, the size of each block depending on the maximum frequency at which the messages can be stored therein; and a means for, each time one or several messages are simultaneously stored in blocks of the buffer memory, storing in a predetermined block of the buffer memory a coded value designating said blocks of the buffer memory.

According to an embodiment of the present invention, the device further comprises a means for reading in the order of their storage the coded values stored in said predetermined block of the buffer memory, for reading in the order of their storage the messages stored in the block(s) of the buffer memory designated by each coded value, and providing the read messages to an external analysis tool.

According to an embodiment of the present invention, each message is formed of one or several data, two messages of a same type being likely to be formed of data of the same type and/or of different types, each block of the buffer memory is divided into sub-blocks, each of which is provided to only store data of a single type of data messages stored in said block, each sub-block being sized to store a predetermined number of data depending on the frequency at which the data are stored therein, and said coded value further designates in which sub-blocks of the block(s) of the buffer memory data have been stored.

According to an embodiment of the present invention, the device further comprises a means for reading in the order of their storage the coded values stored in said predetermined block of the buffer memory, for reading in the order of their storage the data stored in the sub-block(s) of the buffer memory designated by each coded value, for forming messages from the read data, and for providing said messages to an external analysis tool.

According to an embodiment of the present invention, the calculation means is provided not to write a message comprising data which must be stored in a sub-block saturated with data, and to generate an error message indicating that at least one message of the type of said message has been lost.

The present invention also aims at a method for monitoring a microprocessor executing a sequence of instructions, comprising the steps of:

a/ generating one or several digital messages respectively corresponding to the execution of one or several instructions from among a plurality of predetermined instructions, several messages that can be generated at the same time;

b/ each storing messages generated at step a/ in a predetermined block of the buffer memory, the messages simultaneously generated at step a/ being stored in separate blocks, and storing at the same time a coded value indicating in which blocks the messages have been stored;

c/ recovering the coded value written at step b/, and based on said coded value, recovering the messages stored at step b/.

According to an embodiment of the present invention, the monitoring method comprises the step of:

d/ if a message generated at step a/ must be stored at step b/ in a block of the buffer memory which is saturated, generating and storing a specific error message indicating that at least one message of the type of said message has been lost.

According to an embodiment of the present invention, each message is formed of one or several data, where two messages can be formed of data of the same type and/or of data of different types, and at step b/ each of the data forming the messages generated at step a/ is stored in a sub-block of the buffer memory provided to only store a single type of data, the coded value indicating in which sub-blocks the data have been stored; and step c/ comprises of recovering the coded value written at step b/, and based on said coded value, recovering the data of messages stored at step b/ and restoring the message(s) generated at step a/.

According to an embodiment of the present invention, the monitoring method comprises the step of:

d/ if a message generated at step a/ comprises data to be stored at step b/ in a sub-block of the buffer memory which is saturated, generating and storing a specific message error indicating that at least one message of said message has been lost.

Figure 2:
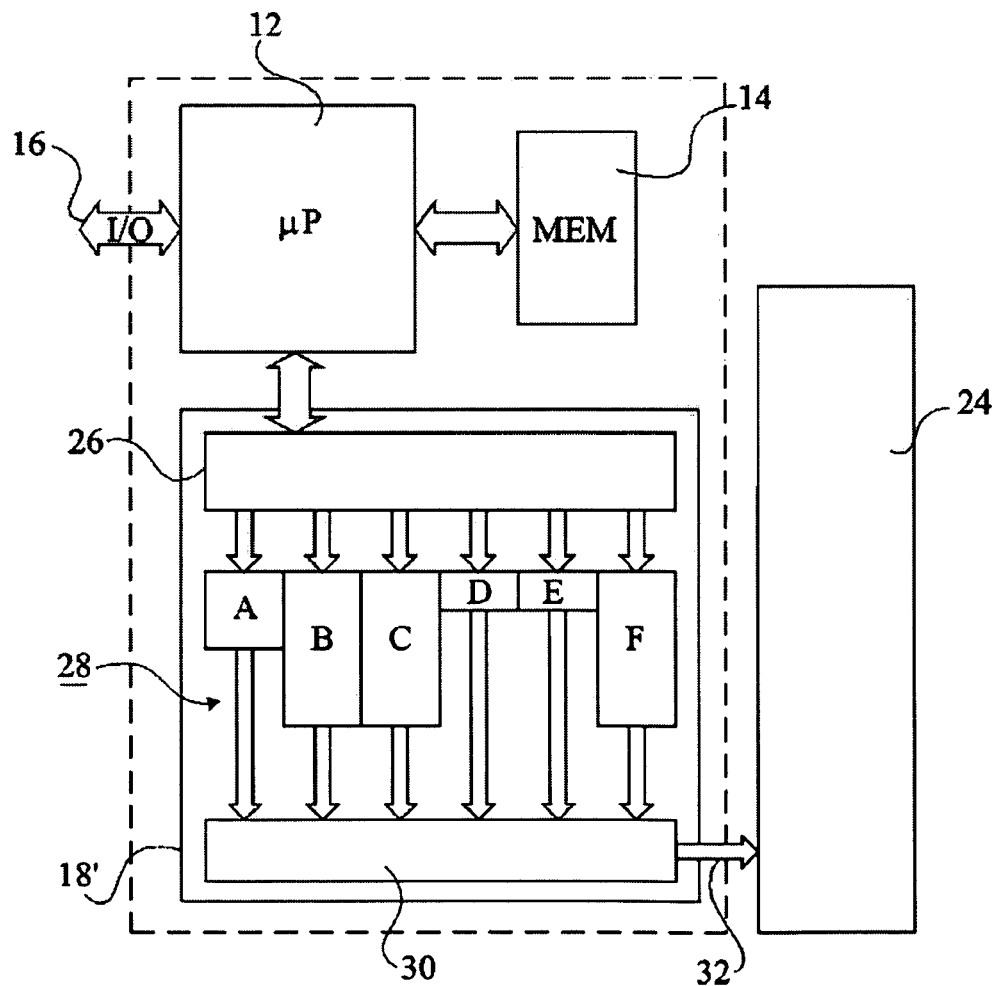

The foregoing and other objects, features, and advantages of the present invention will be discussed in detail in the following non-limiting description of specific embodiments in connection with the accompanying drawings, among which:

FIG. 1, previously described, schematically shows an integrated circuit provided with a monitoring device;

FIG. 2 very schematically shows an integrated circuit provided with a monitoring device according to the present invention; and FIGS. 3A, 3B, and 3C illustrate steps of writing into a buffer memory of a device according to the present invention.

The same reference numerals designate the same elements in the different drawings. Only those elements necessary to the understanding of the present invention have been shown.

FIG. 2 schematically shows an integrated circuit comprising, as in FIG. 1, a microprocessor 12 connected to an internal memory 14, to input/output terminals 16, and to a monitoring circuit 18'. Circuit 18' comprises a calculation circuit 26 receiving information about the instructions executed by the microprocessor, identifying the concerned instruction type and calculating messages provided by the terminal. Calculation circuit 26 is connected to a buffer memory 28 according to the present invention, itself connected to analysis tool 24 via an interface circuit 30 and test terminals forming a parallel access 32.

According to the present invention, buffer memory 28 is divided into several message storage blocks, five in the shown example, A, B, C, D, and E, and an additional block F. An embodiment of the present invention in which calculation circuit 26 is capable of identifying five types of events likely to simultaneously or separately occur and to generate messages corresponding to each of these events will be described hereafter.

It is considered as an example that calculation circuit 26 can generate jump, write, and read messages when microprocessor 12 executes corresponding instructions, a synchronization message when the calculation circuit has generated a predetermined number of jump messages, and a service message when the microprocessor reaches a predetermined condition selected by the user. It is assumed hereafter that one or several of these messages can occur simultaneously.

When calculation circuit 26 generates a jump message, it stores it in the first free box of block A of the buffer memory. Block A comprises a number of boxes which depends on the frequency at which calculation circuit 26 is likely to write jump messages. The number of boxes of block A is reduced with respect to number n of boxes of a conventional buffer memory, since a conventional memory is provided to store all the messages likely to be generated by calculation circuit 26, and not only the jump messages that amount to but a fraction of the messages generated by calculation circuit 26. The boxes of block A of the buffer memory each only have the size necessary to store a jump message. The number of boxes of block A may be evaluated according to the average number of jump messages generated by calculation circuit 26 on execution of various programs by the microprocessor.

A write, read, synchronization, or service message generated by calculation circuit 26 is respectively stored in the first free box of block B, C, D, or E. When several messages are generated at once, each of them is stored in the first free box of block A to E of the buffer memory which is reserved thereto. Since block A, each of blocks B, C, D, and E of the buffer memory comprises a reduced number of boxes depending on the frequency of the writing of the messages into the respective blocks. Similarly, the boxes of blocks B, C, D, and E each only have only the sizes necessary to store respectively write, read, synchronization, and service messages. The numbers of boxes of blocks B to E may be evaluated in the same way as the number of boxes of block A.

According to the present invention, each time calculation circuit 26 stores a single message in a block of the buffer memory or several messages at the same time in blocks of the buffer memory, calculation circuit 26 generates a coded value designating said block(s) of the buffer memory. The coded value is stored in additional block F of the buffer memory at the same time as the message(s) are stored in blocks A to E. According to the embodiment of the present invention, illustrates hereafter in FIGS. 3A to 3C, the coded value may comprise several bits each designating a storage block of the buffer memory. Block F comprises a number of boxes that those skilled in the art will for example determine by simulation. In practice, this number is substantially equal to the number of boxes of a conventional buffer memory.

Interface circuit 30 is provided to read the coded value stored in the first occupied box of block F, then to read the messages stored in the first occupied boxes of blocks A to E designated by said coded value and to send said messages to analysis tool 24.

The surface area taken up by memory 28 and interface 30 according to the present invention is much smaller than the surface area of a conventional buffer memory which should, to perform the same functions as memory 28, comprise n boxes, each of which would be capable of both storing a jump message, a write message, a read message, a synchronization message, and a service message. This is a first advantage of the present invention.

FIGS. 3A to 3C illustrate steps of writing into the buffer memory of FIG. 2. As an illustration, block A comprises two boxes, blocks B and C four boxes each, and blocks D and E one box each. Block F comprises twelve boxes. Each box of block F comprises five bits each corresponding to each blocks A to E. It is considered that if memory 28 is initially empty and that no reading from the buffer memory occurs at the same time as the illustrated steps.

FIG. 3A shows memory 28 after the execution at a first time of a write instruction and of a jump instruction by microprocessor 12. Calculation circuit 26 has respectively stored a jump message JMP1 and a write message WR1 in the first available boxes of blocks A and B. The coded value stored in the first available box of block F has a value 11000 to indicate that a message has been stored in each of blocks A and B and no message has been stored in blocks C, D, and E.

FIG. 3B shows memory 28 after execution oat a second time of a read instruction by microprocessor 12. Calculation circuit 26 has stored a read message RD2 in the first available box of block C. The coded value stored in the first available box of block F has a value 00100 to indicate that a message has been stored in block C only.

FIG. 3C shows memory 28 after the simultaneous execution at a third time of a jump instruction, of a write instruction, and of a read instruction by microprocessor 12, and the simultaneous generation of a synchronization message by calculation circuit 26. Calculation circuit 26 has simultaneously stored a jump message JMP3 in the first available box of block A, a write message WR3 in the first available box of block B, a read message RD3 in the first available box of block C, and a synchronization message SYNC3 in the first available box of block D. A corresponding coded value 11110 has been written into the first available box of block F.

As an illustration, in FIG. 3C, all the boxes of block A store a message. If at a fourth time not shown, before a reading of memory 28 frees at least one box of block A, microprocessor 12 should execute a jump instruction, calculation circuit 26 could not store in block A a corresponding jump message. Calculation circuit 26 is provided to generate an error message indicating that at least one jump message cannot have been stored and has been lost. Calculation circuit 26 is provided to generate similar error messages for blocks B to E. If messages intended to be stored in several blocks are lost, a corresponding error message is generated. It should be noted by those skilled in the art that, even if a block of the buffer memory is saturated, the other blocks may again be used, which is an additional advantage of the present invention. According to an embodiment of the present invention, the error message generated by means 26, when present, is only transmitted when analysis tool 24 has read the number of boxes of the block considered as equal to the total number of boxes of this block.

The present invention has been described in relation with a specific division of the buffer memory in the case where all types of messages generated by the calculation circuit are likely to be generated at the same time. Those skilled in the art will easily adapt the present invention to the case where each block of the buffer memory can receive various types of messages that may not necessarily be generated at the same time.

Further, considering that each message stored in a block of the buffer memory is formed of one or several data of different types, each memory block can be divided into sub-blocks, each of which is provided to store a single type of data. The coded values stored in block F will then comprise as many bits as the buffer memory comprises sub-blocks.

As an example, a jump message may be a so-called direct jump message and only contain a single type of data (I-CNT in the considered standard), or a so-called indirect jump message and contain data of I-CNT type and data of address type (ADDR). Block A can then be divided into a sub-block A' intended to only store data of I-CNT type, and a sub-block A" intended to only store addresses ADDR. The boxes of sub-blocks A' and A" are provided each to only respectively store data l-CNT or an address ADDR. Sub-block A' will comprise as many boxes as undivided block A described in relation with the previous drawings. Sub-block A", which is only intended to store data specific to the indirect jump messages, will comprise a number of boxes smaller than that of sub-block A'. A block A divided in two sub-blocks A' and A" thus takes up a surface area smaller than that of an undivided block A such as described in relation with the previous drawings, and is a preferred embodiment of the present invention.

Of course, at the time of the reading from the buffer memory the data stored in the sub-blocks are reassembled.

Further, calculation circuit 26 is preferably provided to generate distinct error messages according to whether one or the other of the sub-blocks of a block of the buffer memory is saturated, and the unsaturated sub-blocks may again be used to store the data of the messages which are specific thereto, which is an additional advantage of the present invention.

The present invention has been described in relation with a calculation circuit 26 capable of simultaneously generating five message types, but those skilled in the art will readily adapt the present invention to a calculation circuit likely to generate a greater number of messages at the same time. As an example, the calculation circuit may be provided to generate, at the same time, the five message types described in relation with FIG. 2, and a repetition message such as described in application No. PCT/FR02/03526 (B5731PCT), which is incorporated herein by reference.

Further, those skilled in the art will readily adapt the present invention to a microprocessor capable of executing, at the same time, two instructions of the same type, such as two read instructions. It provides, for this purpose, a block of the buffer memory for the message corresponding to each instruction.

The present invention has been described in relation with buffer memories of first-in/first-out type, but will easily adapt to other buffer memory structures.

The present invention has been described in relation with a specific coding of the coded value stored in block F of the buffer memory, but will easily adapt to other codings of the coded value.

The various components of the monitoring device according to the present invention have been described as hardware elements, but it should be noted by those skilled in the art that they may also comprise software elements, or be only formed of software elements.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A monitoring device integrated on the chip of a microprocessor executing a sequence of instructions, comprising:
   a message calculation means for generating digital messages of different types each corresponding to the execution of an instruction from among a plurality of predetermined instructions, the calculation means being capable of generating several types of messages at the same time;
   a buffer memory divided into several blocks, each of which is provided to only store messages of one of the types of messages likely to be generated at the same time, the size of each block depending on the maximum frequency at which the messages can be stored therein;
   means for, each time one or several messages are simultaneously stored in blocks of the buffer memory, storing in a predetermined block of the buffer memory a coded value designating said blocks of the buffer memory.

2. The device of claim 1, further comprising means for reading in the order of their storage the coded values stored in said predetermined block of the buffer memory, for reading in the order of their storage the messages stored in the block(s) of the buffer memory designated by each coded value, and providing the read messages to an external analysis tool.

3. The monitoring device of claim 1, in which each message is formed of one or several data, two messages of a same type being likely to be formed of data of the same type and/or of different types, and in which:
   each block of the buffer memory is divided into sub-blocks, each of which is provided to only store data of a single type of data messages stored in said block, each sub-block being sized to store a predetermined number of data depending on the frequency at which the data are stored therein, and in which
   said coded value further designates in which sub-blocks of the block(s) of the buffer memory data have been stored.

4. The device of claim 3, further comprising a means for reading in the order of their storage the coded values stored in said predetermined block of the buffer memory, for reading in the order of their storage the data stored in the sub-block(s) of the buffer memory designated by each coded value, for forming messages from the read data, and for providing said messages to an external analysis tool.

5. The monitoring device of claim 4, in which the calculation means is provided not to write a message comprising data which must be stored in a sub-block saturated with data, and to generate an error message indicating that at least one message of the type of said message has been lost.

6. A method for monitoring a microprocessor executing a sequence of instructions, comprising the steps of:
   a/ generating one or several digital messages respectively corresponding to the execution of one or several instructions from among a plurality of predetermined instructions, several messages that can be generated at the same time;
   b/ each storing messages generated at step a/ in a predetermined block of the buffer memory, the messages simultaneously generated at step a/ being stored in separate blocks, and storing at the same time a coded value indicating in which blocks the messages have been stored;
   c/ recovering the coded value written at step b/, and based on said coded value, recovering the messages stored at step b/.

7. The monitoring method of claim 6, comprising the step of:
   d/ if a message generated at step a/ must be stored at step b/ in a block of the buffer memory which is saturated, generating and storing a specific error message indicating that at least one message of the type of said message has been lost.

8. The monitoring method of claim 6, in which each message is formed of one or several data, where two messages can be formed of data of the same type and/or of data of different types, and in which
   at step b/ each of the data forming the messages generated at step a/ is stored in a sub-block of the buffer memory provided to only store a single type of data, the coded value indicating in which sub-blocks the data have been stored; and
   step c/ comprises recovering the coded value written at step b/, and based on said coded value, recovering the data of messages stored at step b/ and restoring the message(s) generated at step a/.

9. The monitoring method of claim 8, comprising the step of:
   d/ if a message generated at step a/ comprises data to be stored at step b/ in a sub-block of the buffer memory which is saturated, generating and storing a specific message error indicating that at least one message of said message has been lost.

* * * * *

UNITED STATES PATENT AND TRADEMARK OFFICE
CERTIFICATE OF CORRECTION

PATENT NO. : 7,225,098 B2
APPLICATION NO. : 10/535064
DATED : May 29, 2007
INVENTOR(S) : Xavier Robert It is certified that error appears in the above-identified patent and that said Letters Patent is hereby corrected as shown below:

Col. 1, line 62, should read:
Thus, standard IEEE-ISTO-5001, in preparation, pro-"

Column 2, line 39, should read:
toring circuit according to standard IEEE-ISTO-5001 which Column 6, lines 53-56 should read:
type (ADDR). Block A can then be divided into a sub-block A' intended to only store data of I-CNT type, and a sub-block A" intended to only store addresses ADDR. The boxes of sub-blocks A' and A" are provided each to only respectively store data I-CNT or an address ADDR. Sub-block A' will Signed and Sealed this Twenty-fourth Day of July, 2007

JON W. DUDAS
*Director of the United States Patent and Trademark Office*